United States Patent [19]

Fickes

[11] 4,349,944
[45] Sep. 21, 1982

[54] WIRE INSERTION TOOL

[75] Inventor: Edward L. Fickes, Mechanicsburg, Pa.

[73] Assignee: AMP Incorporated, Harrisburg, Pa.

[21] Appl. No.: 207,309

[22] Filed: Nov. 17, 1980

[51] Int. Cl.$^3$ ............................................. H01R 43/04
[52] U.S. Cl. .................................. 29/566.4; 29/566.3; 29/749; 29/753
[58] Field of Search .................... 29/566.3, 566.4, 749, 29/750, 751, 753, 564.6, 564.7, 564.8, 33 M

[56] References Cited

U.S. PATENT DOCUMENTS

| | | | |
|---|---|---|---|
| 3,845,535 | 11/1974 | Over | 29/749 X |
| 3,864,802 | 2/1975 | Tucci | 29/566.3 |
| 3,886,641 | 6/1975 | Davis | 29/749 X |
| 3,935,628 | 2/1976 | Tucci | 29/749 |
| 3,972,101 | 8/1976 | Casey et al. | 29/749 |
| 4,035,897 | 7/1977 | Over et al. | 29/749 X |
| 4,110,896 | 9/1978 | Roiko | 29/566.3 |
| 4,148,138 | 4/1979 | Becker et al. | 29/566.3 X |

Primary Examiner—William R. Briggs
Attorney, Agent, or Firm—Allan B. Osborne

[57] ABSTRACT

The present invention relates to a tool for use in inserting wires into an elongated connector cap and trimming the protruding ends. The tool includes a hinged head onto which the cap is removably placed and a base member having a ram driven wire inserter bracketed by wire guides. Wires are laced into slots in the guides and across side plates on the wire inserter. The cap bearing head is pivoted around to bring the cap into position between the wire guides and directly above the wire inserter. The ram drives the wire inserter up along both sides of the cap so that ribs on the side plates can force the wires into grooves on the cap. A shear blade simultaneously trims the wires on one side of the cap.

3 Claims, 8 Drawing Figures

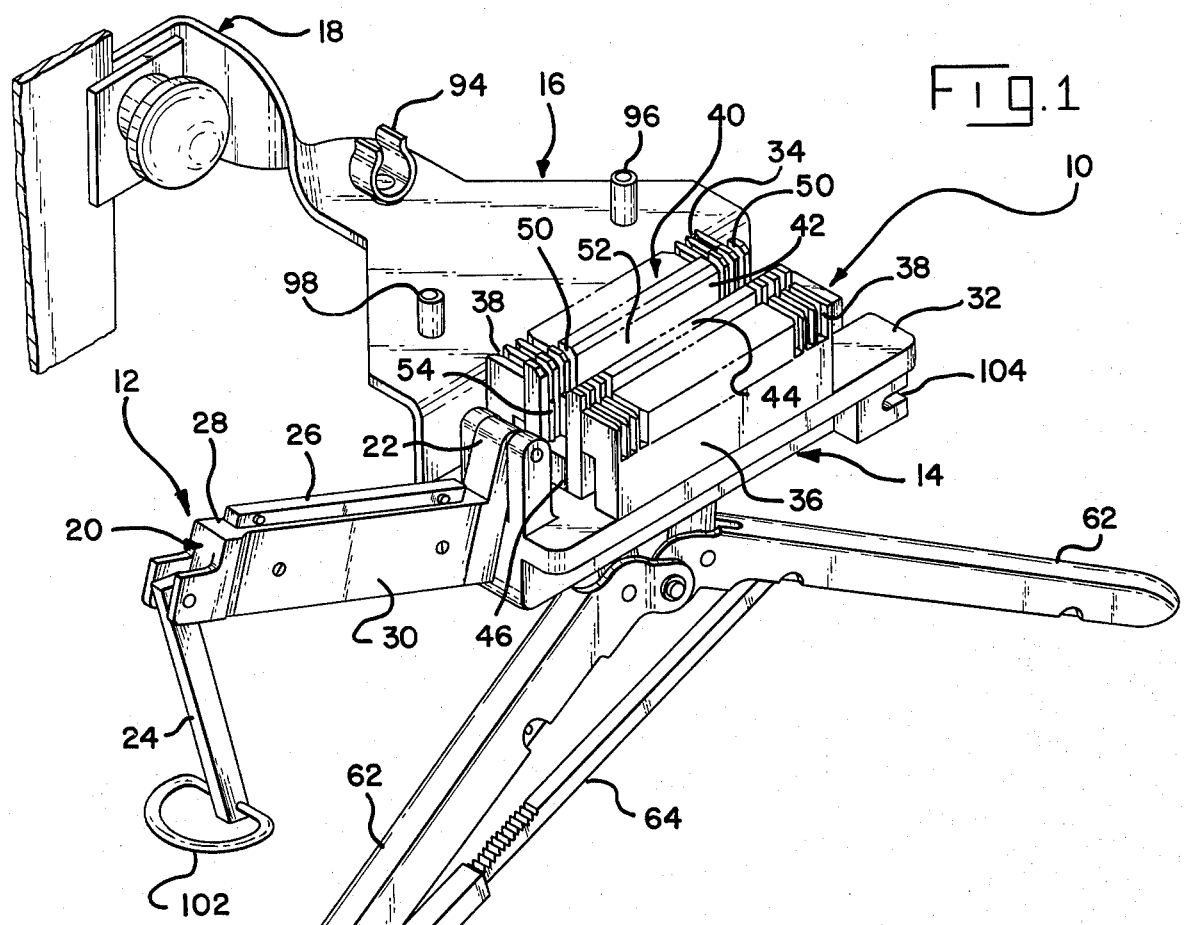
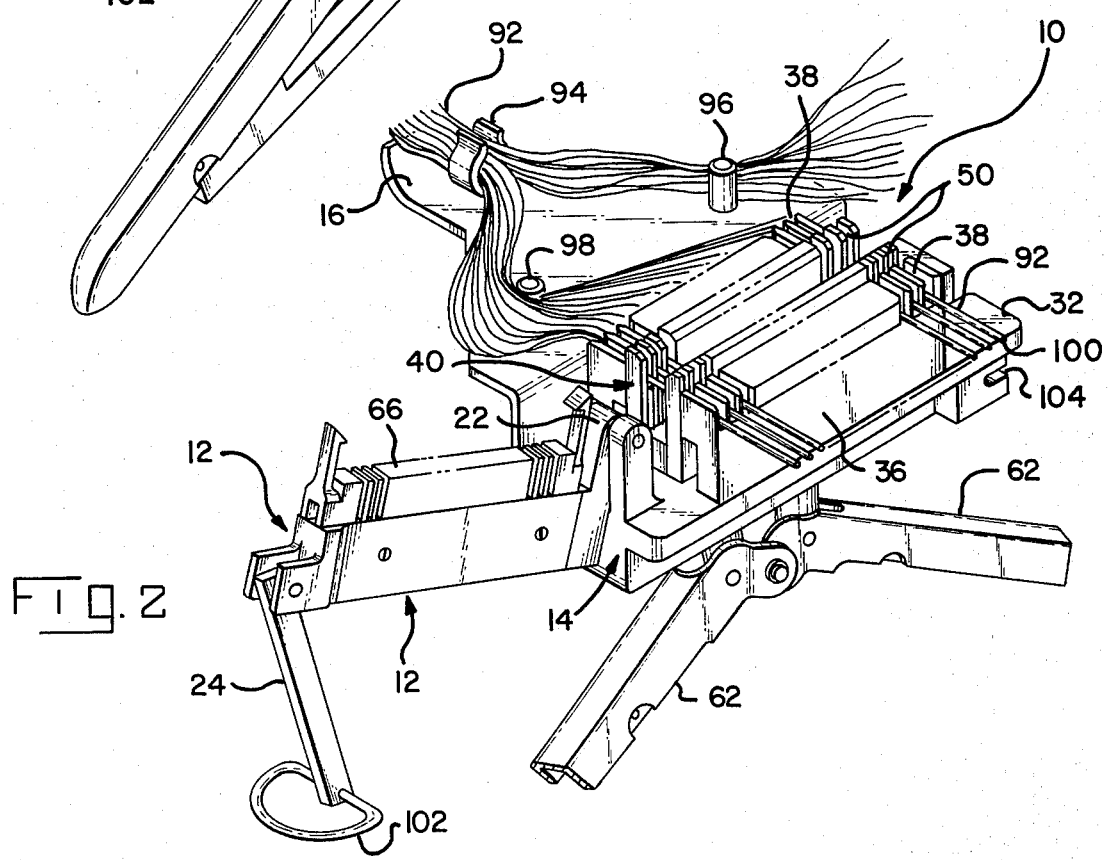

WIRE INSERTION TOOL

BACKGROUND OF THE INVENTION

1. The Field of the Invention

The present invention is directed to those tools which simultaneously insert a plurality of wires into parallel wire receiving grooves on a housing.

2. The Prior Art

Heretobefore, wires were laced into the connector cap by hand, a time consuming and inefficient exercise.

SUMMARY OF THE INVENTION

The wire insertion tool of the present invention includes a connector cap receiving and retaining head pivotally connected to a base plate and a wire guide wire inserter assembly positioned on the plate. The head has a plug on which the cap is placed and a trimming blade. The wire inserter, consisting of two, spaced apart side plates, is positioned between two wire guides and is connected to driving means to drive it up and down between the guides. After wires are laced across the wire guides, the cap bearing head is pivoted around to bring the cap down on top of the wire inserted so that, as the inserter is moved up, the side plates on the inserter travel along the sides of the cap and ribs on the plates forces the wires into grooves on the cap. The blade, in cooperation with the inserter, trims off the excess wire extending out of the cap.

BRIEF DESCRIPTION OF THE DRAWINGS

FIG. 1 is a perspective view of the wire insertion tool constructed in accordance with the present invention;

FIG. 2 is a perspective view of the tool of FIG. 1 along with wires and connector caps in which the wires are to be inserted;

DESCRIPTION OF THE INVENTION

Figure 3:
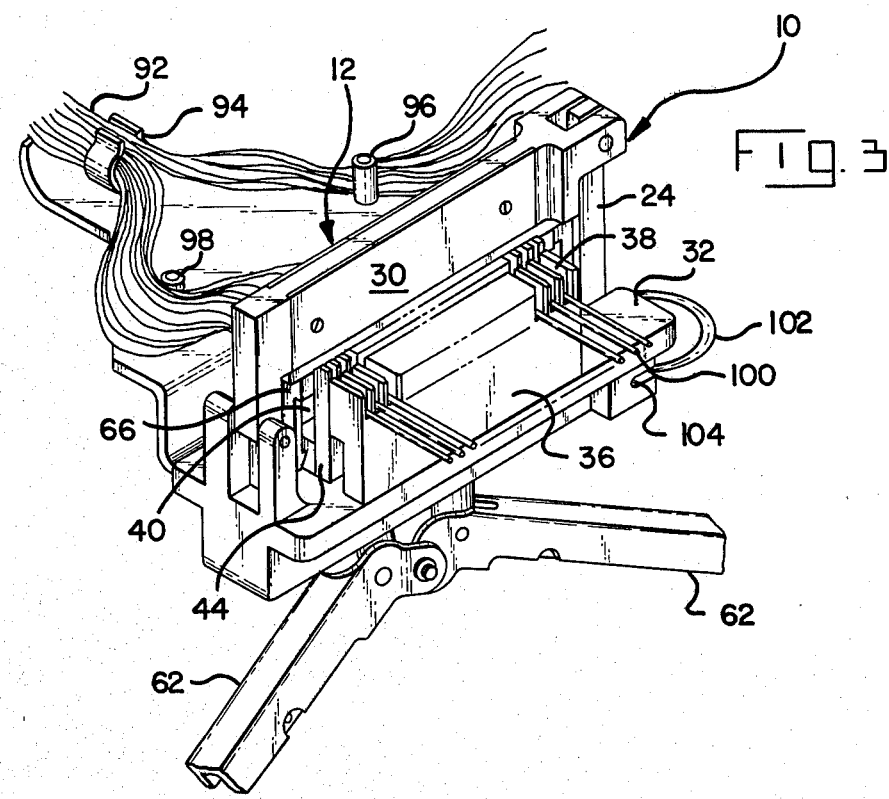
FIGS. 3 and 4 are perspective views of the tool during the operation thereof.

Wire insertion tool 10 as seen in FIG. 1, includes a connector cap receiving head 12 which is hinged to base member 14. Wiring board 16 is removably secured to base member 14. A clamp assembly 18 is provided at one end of board 16 so that tool 10 can be attached to a frame or the like. The clamp leaves both hands of an operator free to lace wires into the wire guides and to operate the tool.

Head 12 of the tool includes an elongated bar 20 having link 22 at one end and hook 24 pivotally connected to the other end. The link pivotally connects the head to base member 14. Plug 26 is fixed to and extends longitudinally along bottom surface 28 of bar 20. Blade 30 is fixed to one side of the bar and projects beyond surface 28.

Base member 14 includes a base plate 32 on which are mounted spaced-apart L-shaped blocks constituting first and second wire guides 34 and 36. Each guide has a plurality of wire-receiving guide slots 38. These slots are open both upwardly and laterally with the depth thereof being predetermined.

Figure 6:
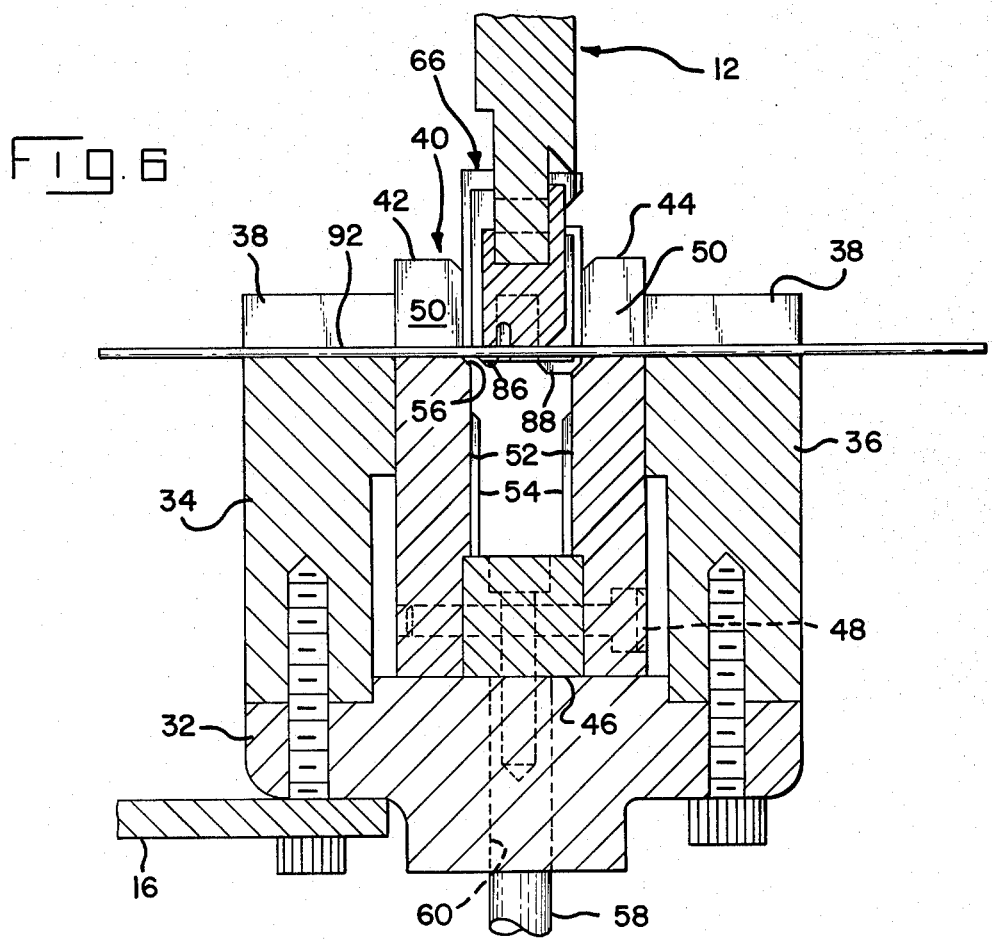
FIG. 6 is a cross-sectional view of the tool in one operational step taken along line 6—6 of FIG. 3.
Figure 7:
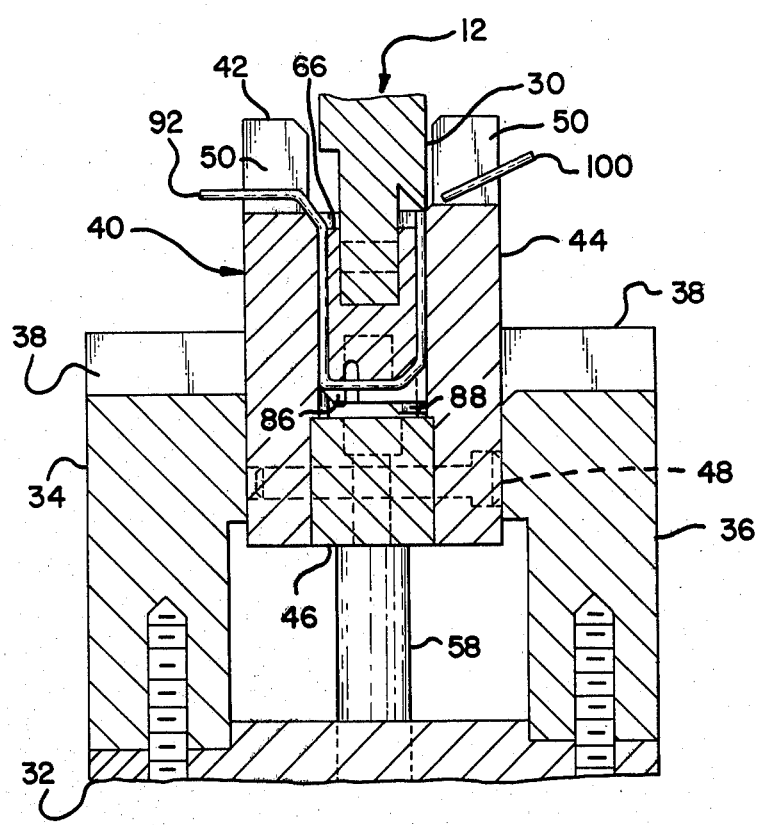
FIG. 7 is a cross-sectional view of the tool in another operational step taken along line 7—7 of FIG. 4.

A U-shaped wire inserter 40 is located on the base plate between the two spaced-apart wire guides and is free to move vertically. The inserter comprises two, vertically extending side plates 42 and 44 which are separated by and fastened to a bridge 46. FIGS. 6 and 7 show the structure clearly. Conventional machine bolts 48 (FIG. 6) are used to secure the side plates to the bridge. Similar fastening means are used to secure wire guides 34 and 36 to base plate 32.

Side plates 42 and 44 each have spaced slots 50 along the length thereof. These slots are on the same spacing as slots 38 on the wire guides; further, they extend vertically downwardly to a depth such that they are on the same horizontal plane as the floors of slots 38 with the tool in a static or rest condition. Again, reference is made to FIG. 6 to illustrate this structural feature.

As shown in FIGS. 1 and 6, inside facing surfaces 52 of both side plates contain vertical, laterally projecting ribs 54 which begin immediately below and are in alignment with slots 50. A bevelled surface 56 provides a transition from slots 50 to ribs 54. These ribs extend down to the top of bridge 46.

With continuing reference to FIGS. 1 and 6, wire inserter 40 is moved vertically by means of shaft 58 which extends up through base plate via passage 60. Shaft 58 is connected to handles 62 through a mechanism (not shown) which translates the pivotal movement of the handles into reciprocal motion. This type of actuating mechanism is well known in the art and does not per se form a part of the present invention. Handles 62 may preferably be fitted with a ratchet mechanism 64 which compels a full stroke by the handles before releasing them to the beginning position. Ratchet mechanism 64 is also well known in the art.

Figure 8:
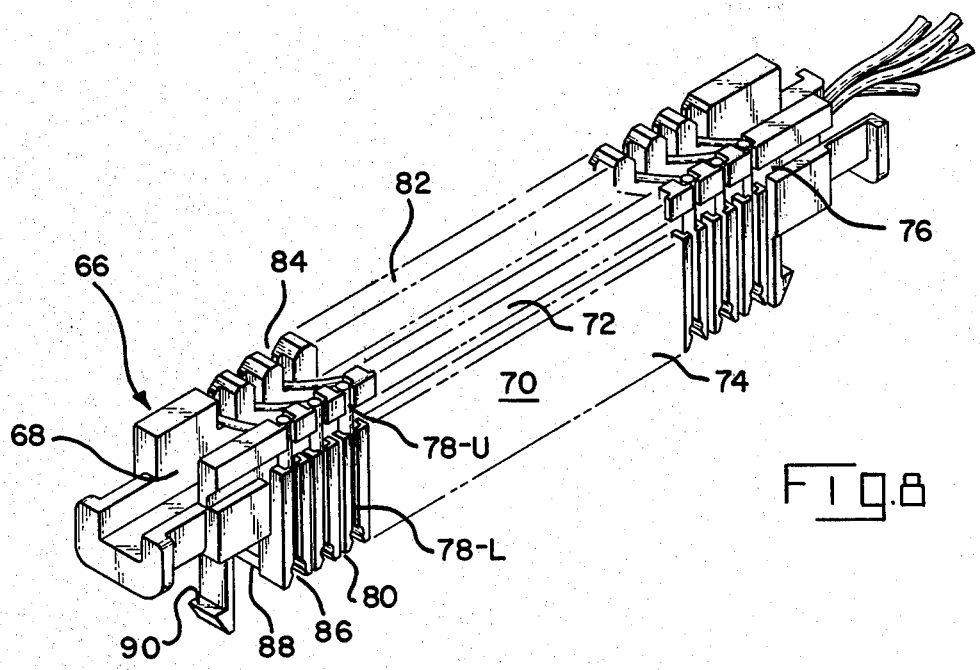
FIG. 8 is a perspective view of the connector cap with wires inserted by the tool of the present invention.

Connector cap 66 into which tool 10 inserts a plurality of wires simultaneously is shown in FIGS. 2 and 8 as well as other Figures. The following brief description of cap 66 is given with reference to FIG. 8.

Cap 66 is an elongated housing preferably molded from an insulating material such as glass-filled nylon. A channel 68 extends from one end to the other. Side wall 70, is separated into upper and lower sections 72 and 74, respectively, by a horizontal groove 76. The upper and lower sections contain, respectively, wire-receiving grooves 78-U and 78-L. In addition, lower section 74 has vertical slots 80 positioned between grooves 78-L. Note that these slots are not present in the upper section.

The other side wall, indicated generally by reference numeral 82, differs from side wall 70 by not having a horizontal groove 76. Wire-receiving grooves 84 are present which extends vertically down the side walls. Further, side wall 82 has slots 80 (not shown) located between the grooves but which extend only part way up the side wall. Wire-receiving grooves 86, extending across the bottom surface 88 of the cap, connect grooves 78 and 84. Latch members 90 depend from either end of the cap.

The structure of the walls defining grooves 78 and 84 are such that the entrances are equal to or slightly narrower than the diameter of the wire to be inserted. Thus, the wire must be squeezed in or forced past the narrow openings to the grooves. Bottom grooves 86 have no such restrictions and the wires pass easily thereinto.

The operation of wire inserting tool 10 will now be described with reference to FIGS. 2, 3, 4, 6, and 7.

With specific reference to FIG. 2, a plurality of wires 92 are placed in clip 94 on wiring board 16. One group of wires are shunted off around peg 96 while the second group are routed around peg 98 and laced or dressed into wire-receiving guide slots 38 and slots 50 in side plates 42-44. As shown in FIG. 2, wire ends 100 extend beyond wire guide 36.

Cap 66 is positioned on cap-receiving head 12 with plug 26 entering channel 68. The cap is retained on the head by an interference fit between the plug and channel.

With reference to FIG. 3, head 12, along with cap 66, is pivoted over and down onto the wire guide-wire inserter assembly located on base plate 32. The head is locked to the base plate by D-ring 102 on hook 24 being received in slots 104 (FIG. 1) on the side of base plate 32.

With reference to FIG. 6, a cross-sectional view taken along line 6—6 of FIG. 3, the arrangement between cap 66 and wire inserter 40 is clearly shown. The bottom surface 88 of cap 66 is located in between side plates 42 and 44 and wires 92 have entered grooves 86 thereon.

Figure 4:
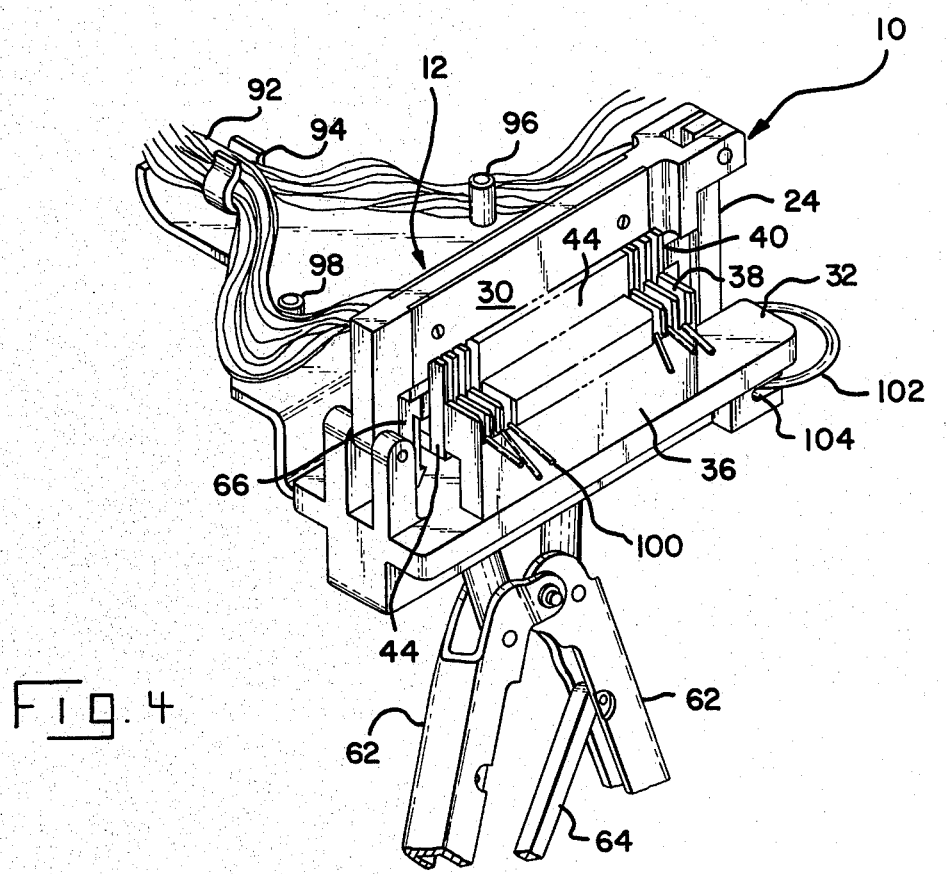

With head 12 and cap 66 in position, handles 62 are moved in towards each other to drive wire inserter 40 upwardly so that side plates 42-44 thereon bracket the cap. As the plates move up, the wires are also moved up, carried by the floors of slots 50. Then, as ribs 54 enter grooves 78-84, they force the wires 92 thereinto. As the wires are held in alignment by bottom grooves 86 and by slots 50 on side plates 42-44, they are forced into the wire-receiving grooves with precision. FIGS. 4 and 7 illustrate this insertion step. The narrow entrance to the wire-receiving grooves lock the wires into the grooves.

As wire inserter 40 reaches the limit of its upward travel, bevelled surface 56 on side plate 44 and blade 30 on head 12 cooperate to trim excess wire ends 100 which are caught in between the two.

Upon releasing handles 62 and returning wire inserter 40 to its rest position shown in FIG. 6, head 12 is unlocked and pivoted so that the loaded cap 66 may be removed.

Figure 5:
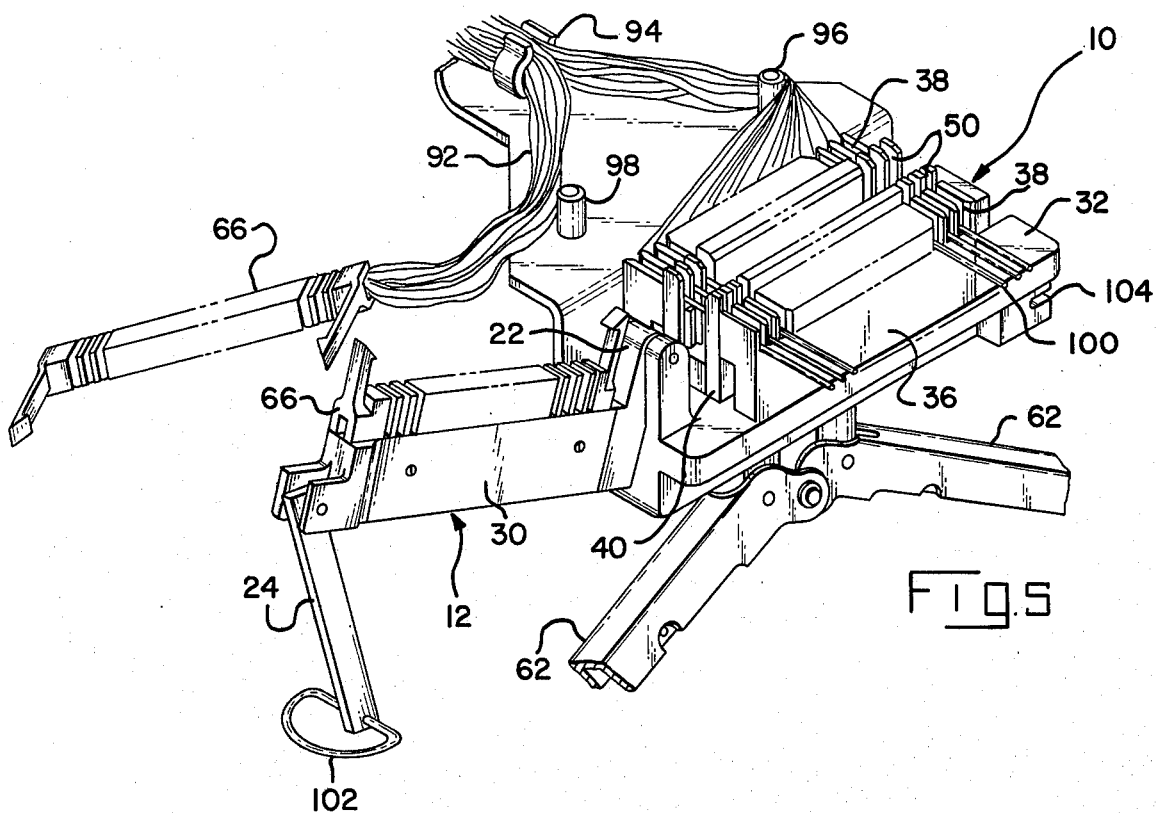
FIG. 5 is a perspective view similar to FIG. 2 demonstrating the harnessing capability of the tool.

FIG. 5 illustrates the case where the other group of wires which were shunted off around peg 96 in FIG. 2, are now laced across wire guide slots 38 and 50. A second cap 66 is mounted onto head 12 so that the laced wires may be inserted in the same manner as described above.

The present invention may be subject to many modifications and changes without departing from the spirit or essential characteristics thereof. The present embodiments are therefore to be considered in all respects as illustrative and not restrictive of the scope of the invention.

What is claimed is:

1. A tool for inserting wires into grooves located on opposing sides of a connector cap, said tool comprising:
   a. a base plate having mounted thereon a pair of spaced apart blocks each having wire-receiving guide slots across the upper surfaces, and a wire inserter movably positioned between the two blocks and consisting of two side plates spaced apart by and fastened to a bridge, said plates having wire-receiving slots in and along their upper edge and ribs extending down their inside surfaces, said ribs, plate slots and guide slots all being in alignment;
   b. a head pivotally connected to the base plate and having means thereon to removably retain a connector-cap in a pre-determined orientation so that upon pivoting the head around over the base plate, the connector-cap is in registration with the wire inserter; and
   c. means to move the wire inserter upwardly with the side plates moving up the sides of the connector-cap so that wires which may have been laced across the slots are pressed into the grooves on the sides of the connector-cap by the ribs.

2. The tool of claim 1 having a bevelled surface between each slot and aligned rib and the head includes a blade on one side such that the blade, in cooperation with the bevelled surface may cut the wires extending away from one side of the connector-cap.

3. The tool of claim 1 further including cooperating latching means on the head and base plate to removably lock the head to the base plate during the insertion of the wires into the grooves.

* * * * *